(12) United States Patent
Gorman et al.

(10) Patent No.: US 6,190,594 B1
(45) Date of Patent: Feb. 20, 2001

(54) TOOLING FOR ARTICLES WITH STRUCTURED SURFACES

(75) Inventors: Michael R. Gorman, Lake Elmo, MN (US); Roger D. Pavlis, Hudson, WI (US)

(73) Assignee: 3M Innovative Properties Company, St. Paul, MN (US)

( * ) Notice: Under 35 U.S.C. 154(b), the term of this patent shall be extended for 0 days.

(21) Appl. No.: 09/259,781

(22) Filed: Mar. 1, 1999

(51) Int. Cl.[7] .................................................. B29C 43/46
(52) U.S. Cl. ........................ 264/167; 264/175; 425/194; 425/363; 425/471; 425/814; 425/327
(58) Field of Search ................................. 264/167, 175; 425/194, 327, 363, 471, 814

(56) References Cited

U.S. PATENT DOCUMENTS

| | | |
|---|---|---|
| 133,454 | 11/1872 | Kellogg . |
| 2,008,597 | 7/1935 | Schaffer . |
| 2,108,013 | 2/1938 | Fehr . |
| 2,570,470 | 10/1951 | Meyer et al. . |
| 2,793,585 | 5/1957 | Granitsas . |
| 2,937,413 | 5/1960 | Hollingsworth . |
| 3,007,231 | 11/1961 | Garver . |
| 3,069,304 | 12/1962 | Fahrbach et al. . |
| 3,192,589 | 7/1965 | Pearson . |
| 3,312,583 | 4/1967 | Rochlis . |
| 3,387,338 | 6/1968 | Kanai et al. . |
| 3,541,216 | 11/1970 | Rochlis . |
| 3,594,863 | 7/1971 | Erb . |
| 3,594,865 | 7/1971 | Erb . |
| 3,718,959 | 3/1973 | Sailas . |
| 3,828,998 | 8/1974 | Gross . |
| 3,969,565 | 7/1976 | Forrest . |
| 4,084,302 | 4/1978 | Aatinen . |
| 4,104,772 | 8/1978 | Sailas . |
| 4,104,773 | 8/1978 | Sailas . |
| 4,149,303 | 4/1979 | Appenzeller . |
| 4,192,050 | 3/1980 | Appenzeller . |
| 4,272,865 | 6/1981 | Schmolke . |

(List continued on next page.)

FOREIGN PATENT DOCUMENTS

| | | |
|---|---|---|
| 55-158925 | 12/1980 | (JP) . |
| WO 87/06522 | 11/1987 | (WO) . |
| WO 97/46129 | 12/1997 | (WO) . |
| WO 97/46130 | 12/1997 | (WO) . |
| WO 98/14086 | 4/1998 | (WO) . |
| WO 98/30381 | 7/1998 | (WO) . |
| WO 98/31520 | 7/1998 | (WO) . |
| WO 98/57564 | 12/1998 | (WO) . |
| WO 98/57565 | 12/1998 | (WO) . |

*Primary Examiner*—James P. Mackey
(74) *Attorney, Agent, or Firm*—Gary L. Griswold; Robert W. Sprague; William J. Bond

(57) ABSTRACT

Tool rolls and methods of using the tool rolls to manufacture articles with one or more structured surfaces are disclosed. The tool rolls include an outer surface that, when used in connection with materials of the proper viscosity or formability, can form a structured surface on an article. Because the tools are manufactured in roll-form, they can be advantageously used in continuous manufacturing processes. Alternatively, discrete articles may be processed using the tool rolls. The tool rolls are constructed of a cylindrical base roll and are wrapped with one or more continuous wires in a helical pattern. The wires are used, in essence, to form a structured surface on the tool roll that is the negative of the structured surface to be formed on the articles processed using the tool roll. One of the wires wound around the base roll may include a plurality of voids formed therein that, when wound in helical coils about the base roll, form a plurality of mold cavities on the outer surface of the tool roll. Alternatively, the helical pattern of one or more wound wires may be used to form a continuous helical structured surface, e.g., a helical groove or grooves.

30 Claims, 11 Drawing Sheets

U.S. PATENT DOCUMENTS

| | | |
|---|---|---|
| 4,342,137 | 8/1982 | Ennis et al. . |
| 4,438,547 | 3/1984 | Schmolke et al. . |
| 4,537,096 | 8/1985 | Hollingsworth . |
| 4,775,310 | 10/1988 | Fischer . |
| 4,953,264 | 9/1990 | Hollingsworth et al. . |
| 5,077,870 | 1/1992 | Melbye et al. . |
| 5,100,512 | 3/1992 | Waters . |
| 5,554,333 | 9/1996 | Fujiki . |
| 5,620,769 | 4/1997 | Wessels et al. . |
| 5,792,411 | 8/1998 | Morris et al. . |
| 5,845,375 | 12/1998 | Miller et al. . |

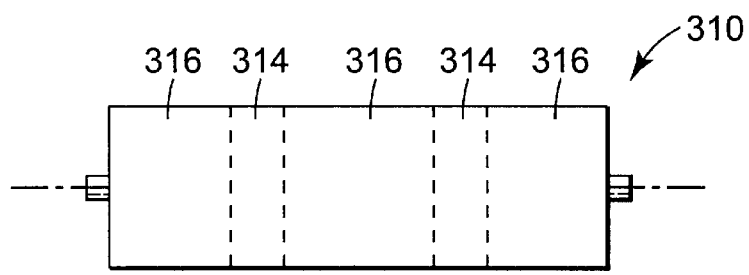
*Fig. 7A*
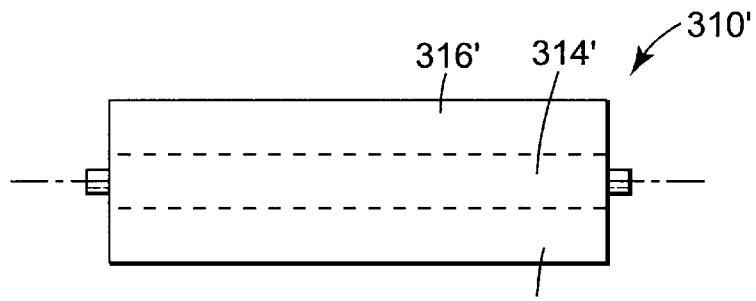
*Fig. 7B*
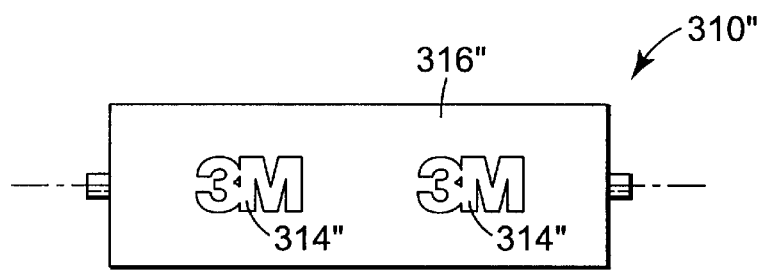
*Fig. 7C*
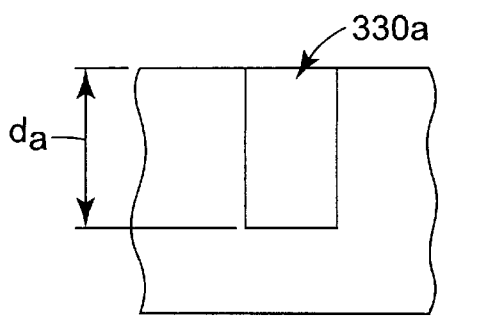 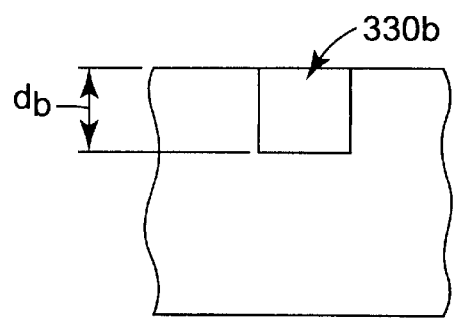
*Fig. 8A*   *Fig. 8B*

TOOLING FOR ARTICLES WITH STRUCTURED SURFACES

FIELD OF THE INVENTION

The present invention relates to the field of manufacturing articles with structured surfaces. More particularly, the present invention provides tooling for manufacturing articles with one or more structured surfaces, methods of manufacturing the tooling, and methods of using the tooling to manufacture articles with one or more structured surfaces.

BACKGROUND

Articles with one or more structured surfaces find a variety of uses. The articles may be provided as films that exhibit, e.g., increased surface area, structures used to provide a mechanical fastener, optical properties, etc. When these films are manufactured for use as mechanical fasteners, the protrusions that are found on the structured surface are commonly referred to as hooks. The hooks may be formed in a curved shape or they may be substantially upright stems that are deformed to include, e.g., a head in the shape of mushroom.

Mechanical fasteners are sometimes designed so that two hook strips can be used to fasten two articles together by adhering each strip to one of the articles and then interengaging the two strips. Such a mechanical fastener is shown in U.S. Pat. No. 3,192,589 (Pearson) which calls the fastener "hermaphroditic" because its headed studs have both male and female characteristics when intermeshed. The Pearson fasteners can be made by molding a base from which integral headless studs project and then heat softening the tips of the studs.

U.S. Pat. No. 5,077,870 (Melbye et al.) discloses one method of manufacturing the hook strip portion of a mechanical fastener by forcing molten material into cavities formed in a moving mold surface. The stems formed by the moving mold surface are then capped to form the desired fasteners. The cavities are formed in the mold surface by drilling. As a result, the cavities are cylindrical in shape and, although some precision can be obtained in depth, diameter and spacing between cavities, it is obtained with some difficulty and increased costs. Furthermore, damage to the mold surface typically requires that the entire mold be discarded.

U.S. Pat. No. 5,792,411 (Morris et al.) discloses a molding tool manufactured by laser machining a mold surface. Molten material is then forced into the cavities in the moving mold surface to form stems. The stems are then capped to form the desired fasteners. Because the cavities are formed by laser ablation, the cavity shape is based on the energy distribution within the laser beam used to form the cavities. Furthermore, precise control over the depth of the cavities is difficult to obtain due to variability in the material used to construct the mold, the power of the laser beam, the energy distribution within the beam, beam focus, etc.

U.S. Pat. No. 4,775,310 (Fischer) and PCT Publication No. WO 97/46129 (Lacey et al.) disclose tooling used to manufacture hook strips for a hook-and-loop style mechanical fastener. The tools are formed by a hollow drum with a water cooling jacket. A series of mold disks or alternating mold disks and spacer plates are laminated together along the length of the drum to form the desired mold cavities on the face of the roll. Disadvantages of these designs include the cost of manufacturing the mold disks with adequate precision to ensure that the mold cavities are of the same depth, length, spacing, etc. Size limitations imposed on the disks by manufacturing difficulties can, in turn, limit line speed in processes using the tools. Other disadvantages of this design include non-uniform cooling of the mold cavities, non-uniformities in the products produced by the stacked plates, etc.

SUMMARY OF THE INVENTION

The present invention provides tool rolls and methods of using the tool rolls to manufacture articles with one or more structured surfaces. The tool rolls include an outer surface that, when used in connection with materials of the proper viscosity or formability, can form a structured surface on an article. Because the tools are manufactured in roll-form, they can be advantageously used in continuous manufacturing processes. Alternatively, discrete articles may be processed using the tool rolls of the present invention.

By "structured surface" it is meant that a surface of the article deviates from a planar or other smooth surface. For example, the structured surface may include protrusions extending therefrom, such as stems used in connection with mechanical fasteners. Other alternative structured surfaces include, but are not limited to: continuous grooves or ridges, elongated structures, etc.

The tool rolls of the present invention are constructed of a cylindrical base roll and are wrapped with one or more continuous wires in a helical pattern. The wires are used, in essence, to form a structured surface on the tool roll that is the negative of the structured surface to be formed on the articles processed using the tool roll. In one embodiment, at least one of the wires wound around the base roll may include a plurality of voids formed therein that, when wound in helical coils about the base roll, form a plurality of mold cavities on the outer surface of the tool roll. Alternatively, the helical pattern of one or more wound wires may be used to form a continuous helical structured surface, e.g., a helical groove or grooves.

Advantages of the tool rolls include, but are not limited to the ability to replace the wire windings on the base roll if the outer surface of the tool roll becomes damaged or worn. The tool rolls may also be relatively inexpensive as compared to the cost of manufacturing tool rolls using, e.g., stacked plates or direct drilling of the mold surface.

Another advantage is the ability to control the spacing between mold cavities along the width of the roll by varying the thickness of the wire or wires wrapped around the base roll. Spacing of the mold cavities about the circumference can also be independently controlled by controlling the spacing between voids in the wire or wires wrapped around the base roll. A further advantage is that, by controlling the profile or cross-sectional shape of the wire or wires and the shape or shapes of the voids formed in the wire, variations in the shape or shapes of the mold cavities can also be achieved.

Yet another advantage of the present invention is the relatively small thermal mass of the wire or wires wrapped around the base roll in comparison to the thermal mass of the base roll. As a result, thermal control over the mold cavities can be improved, which can result in corresponding improvements in the uniformity of the products produced using the tool rolls.

As used in connection with the present invention, a "mold cavity" may be any discontinuity in an otherwise smooth or planar surface into which moldable material may flow during a molding process. In some embodiments of the present invention, the tool rolls may include mold cavities with high aspect ratios as defined below, although it should be understood that a mold cavity need not have a high aspect ratio.

In one aspect, the present invention provides a tool roll including a cylindrical base roll. A first wire including a plurality of first voids formed therein is wound in helical coils around the base roll. The plurality of first voids in the first wire form a plurality of first cavities, each cavity of the plurality of first cavities including an opening at an outer surface of the tool roll.

In another aspect, the present invention provides a method of forming a structured surface on an article using a tool roll that includes a cylindrical base roll and a first wire having a plurality of first voids formed therein. The first wire is wound in helical coils around the base roll, such that the plurality of first voids in the first wire form a plurality of first cavities. Each cavity of the plurality of first cavities forms an opening at an outer surface of the tool roll. A moldable material is contact with the outer surface of the tool roll to form the structured surface using the outer surface of the tool roll, the moldable material at least partially filling at least some of the first cavities. The structured surface thus formed is then removed from the outer surface of the tool roll, wherein the structured surface comprises a plurality of protrusions corresponding to the plurality of first cavities.

In another aspect, the present invention provides a method of forming a structured surface on an article using a tool roll that includes a cylindrical base roll and first and second wires wound in helical coils around the base roll. The helical coils of the first and second wires alternate over a width of the roll. The height of the first wire above the base roll is less than the height of the second wire above the surface of the base roll, such that a helical groove is formed on an outer surface of the tool roll. A moldable material is contacted with the outer surface of the tool roll to form a structured surface on an article using the outer surface of the tool roll, the moldable material at least partially filling at least a portion of the helical groove formed by the first and second wires. The structured surface thus formed is then removed from the tool roll and includes a series of ridges formed therein.

These and other features and advantages of the present invention are described below in connection with illustrative embodiments of the present invention.

BRIEF DESCRIPTION OF THE DRAWINGS

FIG. 7A is a plan view of a tool roll including circumferential areas with different mold cavities.

FIG. 7B is a plan view of a tool roll including a longitudinal area with different mold cavities.

FIG. 7C is a plan view of a tool roll including a logo with different mold cavities in the area of the logo.

FIGS. 8A & 8B illustrate mold cavities with different depths.

DETAILED DESCRIPTION OF ILLUSTRATIVE EMBODIMENTS OF THE INVENTION

The present invention provides tool rolls and methods of using the tool rolls to manufacture articles with one or more structured surfaces. The tool rolls include an outer surface that, when used in connection with materials of the proper viscosity or formability, can form a structured surface on an article. Because the tools are manufactured in roll-form, they can be advantageously used in continuous manufacturing processes to form e.g., films, sheets, etc. Alternatively, discrete articles may be processed using the tool rolls of the present invention.

The tool rolls of the present invention may include a plurality of cavities in their outer surfaces that, when used in connection with materials of the proper viscosity or formability, can form protrusions or structures on at least one surface of a film. Alternatively, two such rolls can be used in combination to form a film in which both major surfaces exhibit protrusions or structures.

Figure 1:
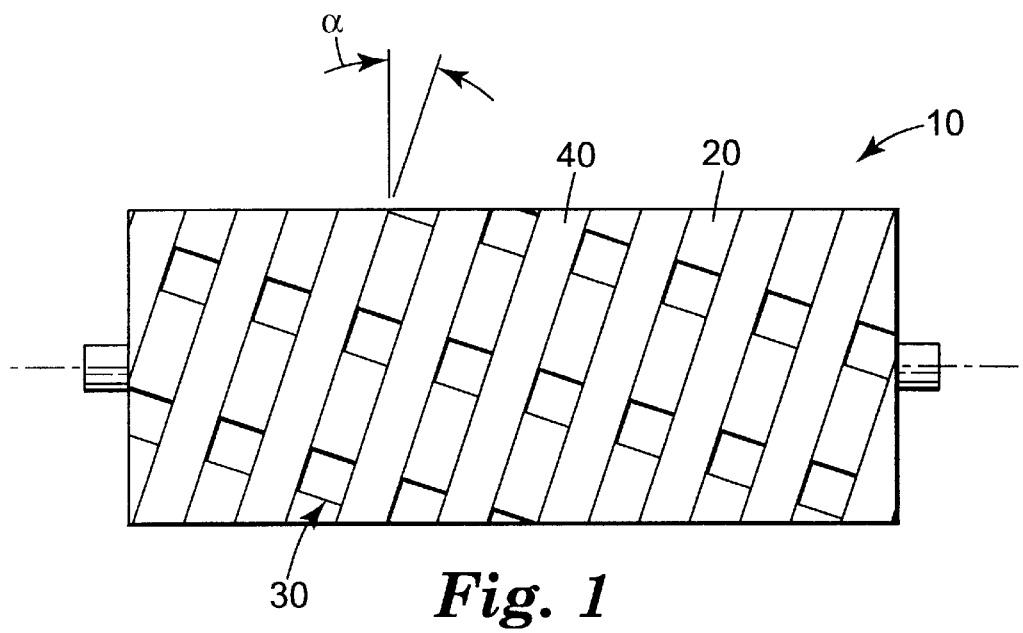
FIG. 1 is a plan view of one tool roll including a plurality of cavities formed therein according to the present invention.
Figure 2:
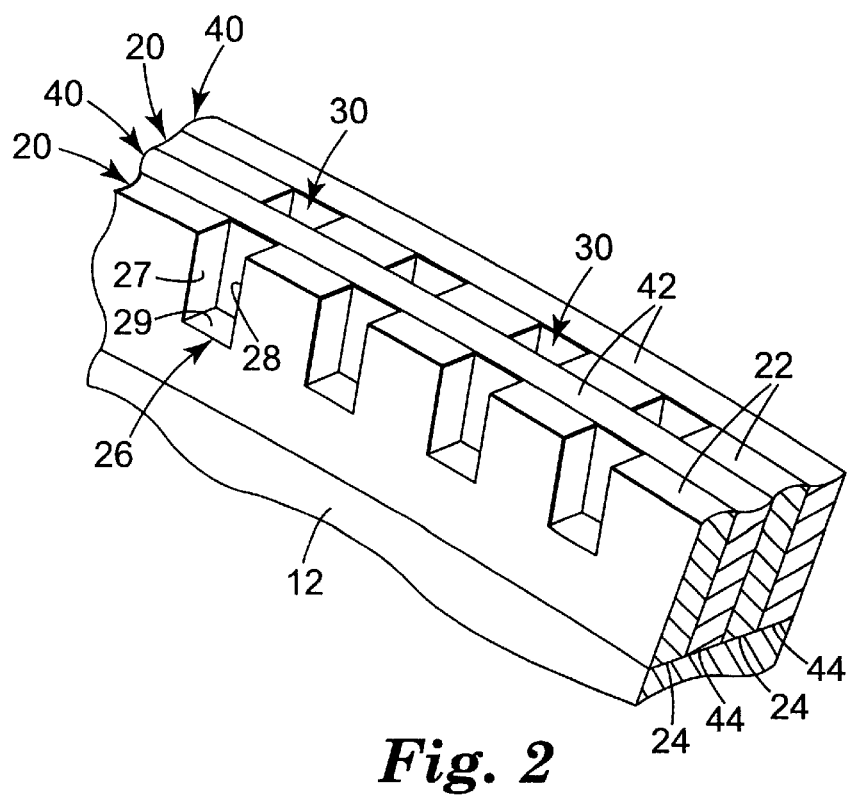
FIG. 2 is an enlarged cut-away perspective view of a portion of the surface of the tool roll of FIG. 1 illustrating the cavities formed therein.

FIG. 1 depicts one illustrative embodiment of a tool roll 10 according to the present invention including a plurality of mold cavities 30 opening into an outer surface of the tool roll 10. FIG. 2 illustrates an enlarged partial cut-away view of the surface of the tool roll 10 of FIG. 1. The tool roll 10 preferably includes a cylindrical base roll 12 around which one or more wires are wrapped in the shape of a helical coil to produce a surface having a plurality of mold cavities 30 formed therein.

The wire or wires wrapped around the base roll 12 may be held in place by any suitable mechanism, including, but not limited to: clamps, welding, adhesives, etc. Such techniques are known in the production of, e.g., carding rolls. See, e.g., U.S. Pat. No. 4,272,865 (Schmolke).

Figure 1A:
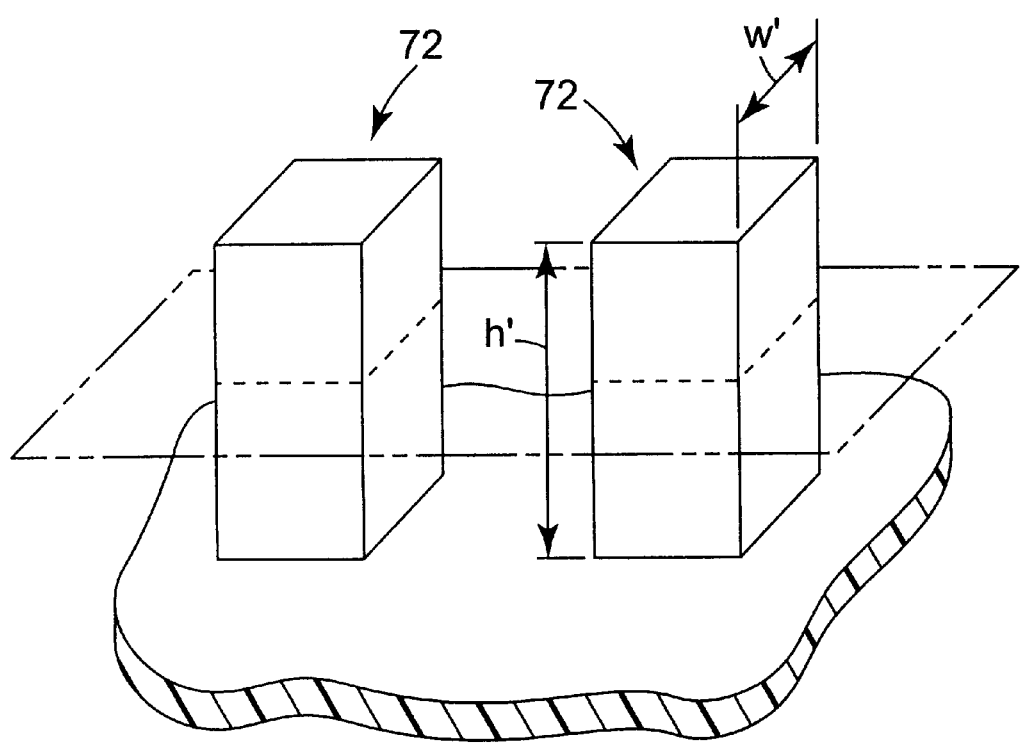
FIG. 1A is an enlarged perspective view of a structured surface formed using a tool roll according to the present invention.

One preferred application in which tool rolls manufactured according to the present invention such as tool roll 10 may be used is in the production of high aspect topology structured surfaces. Referring to FIG. 1A, one illustrative article 70 formed using tool roll 10 is depicted including a structured surface having a plurality of protrusions 72 formed thereon. The illustrated protrusions have a height h' above the surface 74 of the article 70 and a minimum width w' measured in a plane I generally parallel to the plane of the surface 74. If the surface 74 has some curvature, the plane I is preferably oriented tangential to the surface 74 in the area of the protrusion 72.

The protrusions 72 may have a high aspect ratio and the tool rolls according to the present invention may be particularly advantageous in the manufacturing of structured surfaces with high aspect ratio topologies. By "high aspect ratio" it is meant that the ratio of protrusion height to minimum width (h':w') is, e.g., at least about 0.5:1 or higher, more preferably about 1:1 or higher, and even more preferably at least about 2:1 or higher. In addition to, or in place of, high aspect ratio as defined above, it may be preferred that the protrusion or structure height h' above the major surface of the article be, e.g., about 0.1 millimeters or more, more preferably about 0.2 millimeters or more, and even more preferably about 0.4 millimeters or more.

Where the article 70 is provided in sheet or film form, it may advantageously be used to manufacture mechanical fasteners (e.g., mushroom-type or hook-type mechanical fasteners). If the article 70 is used as a mechanical fastener, the protrusions 72 may commonly be referred to as stems, although use of that term is not intended to limit the scope of use for the articles manufactured using the present invention.

Although the articles that can be produced by tool rolls and methods of the present invention are advantageously used as mechanical fasteners, the articles may find a variety of other uses and the tool rolls and methods of using the tool rolls to manufacture articles with structured surfaces according to the present invention should not be limited to the field of mechanical fasteners. For example, the protrusions formed on the structured surface of an article according to the present invention may provide advantages in retaining adhesives or other coatings/materials by, e.g., increasing the surface area of the film. The structured surfaces formed by the tool rolls may also be useful for decorative purposes, as flow channels, drag reduction structures, abrasive backings, etc.

The helical nature of the wrapped wires is illustrated in FIG. 1. The coils are preferably oriented at a helix angle α relative to a reference line that is normal to the surface of the cylindrical tool roll 10. As a result of the helical nature of the wrapped wires, they progress across the surface of the roll 10 from one end to the opposite end. The helix angle α is preferably rather small, e.g., about 5 degrees or less, although larger helix angles could be used. Smaller helix angles will typically result in smaller spacing between the mold cavities along the longitudinal axis 11 of the tool roll 10.

The illustrated tool roll 10 is manufactured using a cylindrical base roll 12 around which a continuous wire 20 including a plurality of voids 26 and a spacer wire 40 are wound. The result is that alternating helical coils of wire 20 with voids 26 and spacer wire 40 are disposed over the surface of the tool roll 10. The inner edges 22 of the wire 20 and the inner edge 44 of the spacer wire 40 are wrapped around the base roll 12 while the outer edges 22 and 42 of the wires 20 and 40, respectively, are wound facing outward from the base roll 12. Both the wire 20 and the spacer wire 40 preferably have rectangular cross-sections compatible with an even progression of the helical coils across the roll 10.

The voids 26 provided in the wire 20 are formed through the full width of the wire 20 and include opposing side walls 27 and 28 and bottom 29 as seen in FIG. 2. It is preferred, but not required that each of the voids 26 be of the same size and be evenly-spaced along the length of the wire 20 to provide uniformity in the spacing of the resultant mold cavities 30. It is further preferred that the outer edge 22 of the coils of wire 20 is even with the outer edge 42 of the spacer wire 40 such that the areas between the mold cavities 30 in the finished tool roll 10 are substantially smooth, i.e., without significant discontinuities between the wires 20 and 40.

Alternatively, the outer edges 22 and 42 of the wires 20 and 40, respectively, may be located at different heights above the surface of the base roll 12. Wires 20 and 40 with different heights can impart a structure to the surface of the article being manufactured. That structure may be in the form of elongated ridges that may provide reinforcement to, e.g., the taller protrusions formed by the mold cavities and/or the article itself.

The wire 20, including voids formed therein that provide the desired mold cavities 30 when wound around the base roll 12 as discussed above, is preferably manufactured using a wire or strip having a generally rectangular cross-section. The voids 26 are preferably provided through the thickness of the wire 20 such that each void includes only two sides 27 and 28 aligned along the length of the wire 20 and a bottom 29. Wire 20 may be manufactured with the voids 26 or a wire with a substantially uniform profile may first be manufactured and then processed by any suitable technique or techniques to form the voids 26 therein. The suitable technique or techniques may include, but not limited to: punching, stamping, conventional machining, laser machining, electronic discharge machining, water jet machining, etching, etc. The punching of wires to provide desired shapes is known in, e.g., the carding roll industry. See, e.g., U.S. Pat. No. 4,537,096 (Hollingsworth). The wire 20 may be manufactured from any suitable material or materials, although some preferred materials include steels, more preferably medium to low carbon steels.

Figure 3A:
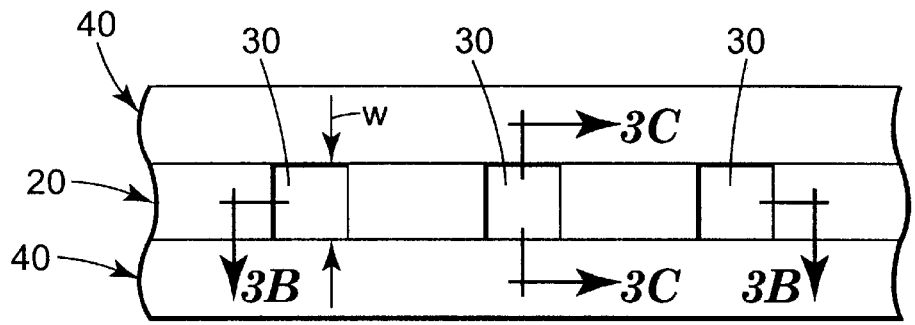
FIG. 3A is an enlarged plan view of the surface of the tool roll of FIG. 1.
Figure 3B:
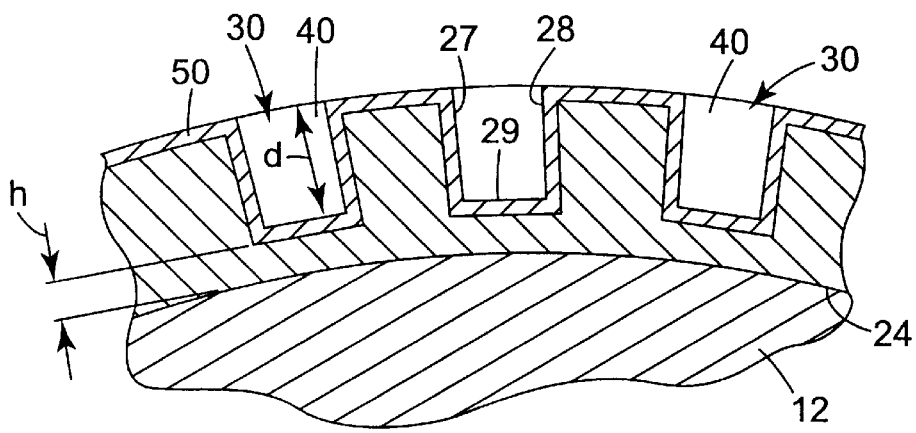
FIG. 3B is a cross-sectional view of FIG. 3A taken along line 3B—3B.
Figure 3C:
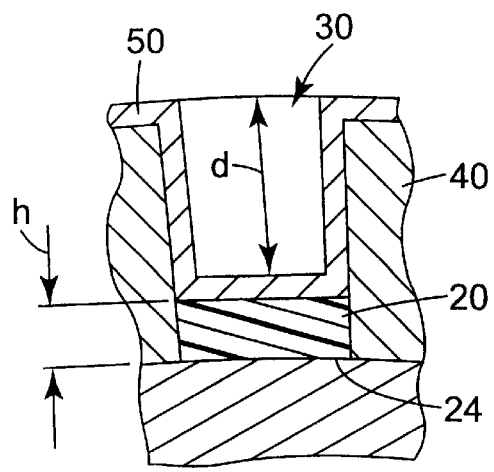
FIG. 3C is a cross-sectional view of FIG. 3A taken along line 3C—3C.

The mold cavities 30 illustrated in FIGS. 1 & 2 have substantially uniform cross-sectional areas along their depth from the opening at the surface of the tool roll 10 to the mold cavity bottoms 29. FIG. 3A is an enlarged plan view of a few mold cavities 30 and FIGS. 3B and 3C are cross-sectional views of the mold cavities 30 along lines 3B—3B and 3C—3C, respectively. The mold cavities 30 exhibit generally rectilinear tangential cross-sectional areas along their depths d. By tangential, it is meant that the cross-section is taken along a tangent to the roll 10.

By rectilinear, it is meant that the shape of the mold cavity 30 in the tangential cross-section is formed by substantially planar sides. The illustrated cavities 30 are also oriented substantially along the radius of the roll 10, although various orientations are possible as discussed below.

Sides 27 and 28 of the mold cavities 30 may be parallel or they may be formed with a draft angle such that sides 27 and 28 are farther apart at the openings of the mold cavities 30 than at the bottoms of the mold cavities 30 or vice versa One advantage of the tool rolls of the present invention is the ability to precisely control the height h of the bottom 29 of the mold cavities 30 above the bottom or inner surface 24 of the wire 20. The bottom 29 of the mold cavity 30 will typically correspond to the end of the mold cavity.

In those instances, however, where the mold cavities have non-uniform shapes, e.g., the cavities are formed in the shape of hook or other structure, the "bottom" of the mold cavity is defined as the portion of the mold cavity that is closest to the inner surface of the wire. One example of such a mold cavity is illustrated in FIG. 6C where the mold cavity 230c has a bottom 229c closest to the inner edge 224c of the wire 220c. The bottom 229c is located at a height $h_c$ above the inner edge 224c of the wire 220c. Furthermore, the depth $d_c$ of the mold cavity 230c is also defined by the bottom 229c of the mold cavity 230c. The mold cavity 230c has an end 231c that is distinguishable from its bottom 229c because the mold cavity 230c turns away from the inner edge 224c of the wire 220c.

The preferred cylindrical base rolls 12 are precision formed to have tightly controlled runouts. That precision runout, in combination with a tightly controlled height dimension h in the wires 20 can provide mold cavities 30 with substantially uniform depths d as measured from the outer surface of the roll 10. The tolerances to which the height dimension h can be controlled will generally be relatively small and the runout of the base roll 12 can be tightly controlled, resulting in overall tight tolerance control in the finished tool roll 10.

The mold cavities 30 can also be characterized in terms of aspect ratio as discussed above in connection with protrusions 72 on article 70 in FIG. 1A. The aspect ratio of the mold cavities 30 will be determined based on the depth d as compared to the minimum width w (see FIG. 3A) of the mold cavities, where the minimum width w is measured in a plane tangential to the surface of the base roll 12. In other words, the aspect ratio of the mold cavities 30 is d:w and, where the tool roll 10 is to be used to manufacture articles having a structured surface with high aspect ratio topology, it may be preferred that the ratio d:w be, e.g., at least about 0.5:1 or higher, more preferably at least about 1:1 or higher, and even more preferably at least about 2:1 or higher. In addition to, or in place of, high aspect ratio as defined above, it may be preferred that the mold cavity depth d be, e.g., about 0.1 millimeters or more, more preferably about 0.2 millimeters or more, and even more preferably about 0.4 millimeters or more.

FIGS. 3B and 3C illustrate another feature of the invention, namely the addition of a plating or other coating 50 on the roll 10. The illustrated coating 50 is located over the entire outer surface of the tool roll 10, i.e., the areas between the mold cavities 30 as well as on the inner surface of the mold cavities 30. Alternatively, the coating could be located only on the outer surface of the roll 10 and absent from the inner surfaces of the cavities 30. In another alternative, the coating 50 could be located only in the cavities 30 and not on the outer surface of the roll 10. In still another alternative, a first coating could be located in the mold cavities 30 and a second coating could be located on the outer surface of the tool roll 10.

Although the coating 50 is illustrated as a homogenous layer, it should be understood that coating 50 may actually be a combination of one or more materials intermixed or applied in successive layers. The material or materials used in coating 50 may vary depending on the desired physical properties. Some physical properties that may be desired include, but are not limited to increased wear resistance, controlled release characteristics, controlled surface roughness, bonding between adjacent wire windings, etc. Some preferred materials may be metal platings, more particularly an electroless nickel plating, chrome, etc.

Figure 4:
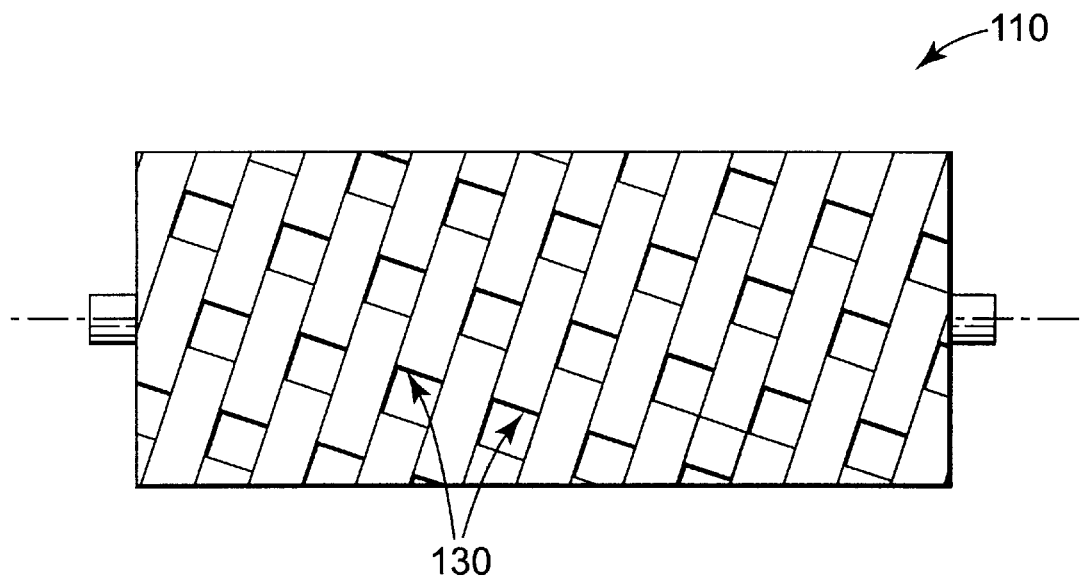
FIG. 4 is a plan view of another tool roll including a plurality of cavities formed therein according to the present invention.
Figure 5:
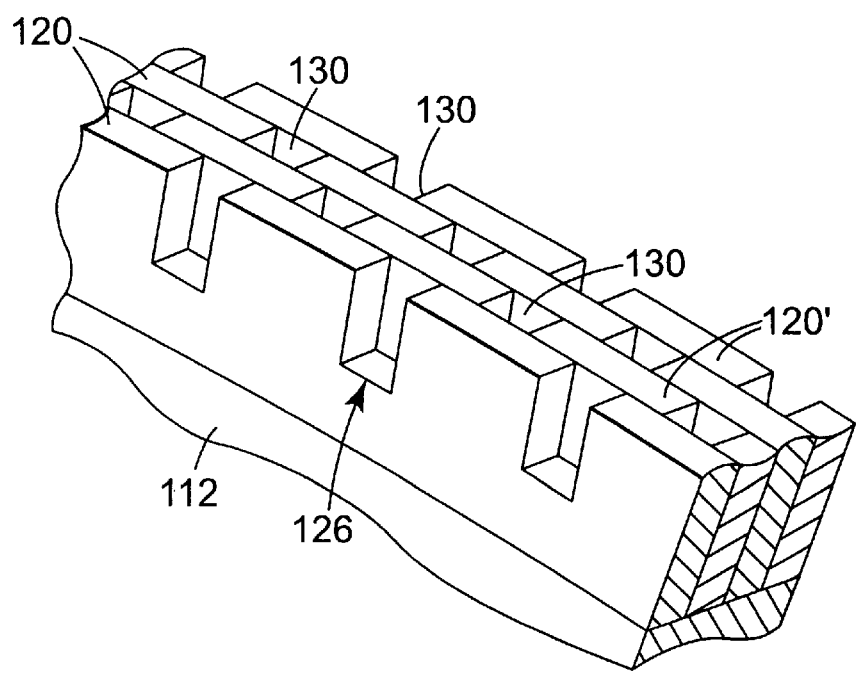
FIG. 5 is an enlarged cut-away perspective view of a portion of the surface of the tool roll of FIG. 4 illustrating the cavities formed therein.

FIGS. 4 and 5 depict another illustrative embodiment of a tool roll 110 including a plurality of mold cavities 130 opening into an outer surface of the tool roll 110. The tool roll 110 preferably includes a cylindrical base roll 112 around which one or more wires are wrapped in the shape of a helical coil to produce a surface having a plurality of mold cavities 130 formed therein.

As best illustrated in FIG. 5, the surface of the tool roll 110 can be wound with two wires 120 and 120' each of the wires including voids formed therein that, when wound together, form the mold cavities 130. One difference between the tool roll 110 and roll 10 is that instead of a spacer wire 40 with a substantially uniform cross-section, the roll 110 includes two wires that both include voids formed therein. One advantage of the design of tool roll 110 is the ability to provide higher density mold cavities 130, i.e., reduced spacing between the mold cavities 130.

Although the illustrated tool roll 110 is preferably provided using two wires 120 and 120', it will be understood that the tool roll 110 could be produced using three or more wires. In yet another alternative, the tool roll 110 could be provided with a single wire in which case the reference numbers 120 and 120' would designate alternate windings or coils of the wire. Such an embodiment may require tighter control over the dimensions of the wire 120 and the base roll 112 to prevent alignment of the mold cavities 130 formed in adjacent coils of the wire 120. Because that control may be difficult to achieve, it may be preferable to use two or more different wires as discussed above.

FIGS. 6A–6E illustrate various shapes for voids in the wires used in connection with the present invention that vary from the substantially uniform voids discussed above. One advantage of the tool rolls according to the present invention is that the voids can be formed with different shapes and/or orientations to provide mold cavities that also have different shapes and/or orientations. It will be understood that use of some of these mold cavities to produce a finished film with desired protrusions will depend on resin selections and process conditions.

Figure 6A:
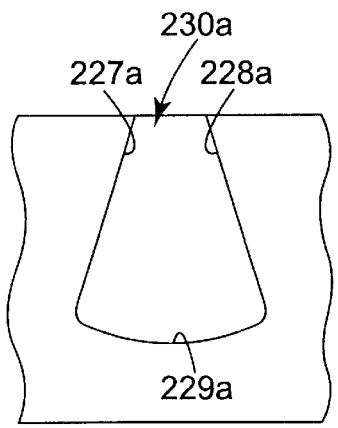
FIGS. 6A–6E illustrate a variety of mold cavity shapes.

The mold cavity 230a in FIG. 6A has a varying cross-sectional area that increases from the opening of the cavity 230a to the bottom 229a. The side walls 227a and 228a are diverging in that direction. As a result, the cavity 230a has a tangential cross-sectional area proximate the bottom 229a of the cavity 230a that is larger than the tangential cross-sectional area at the opening of the cavity 230a. An additional feature illustrated in FIG. 6A is that the bottom 229a of the cavity 230a is non-planar, with the illustrated shape being curved.

Figure 6B:
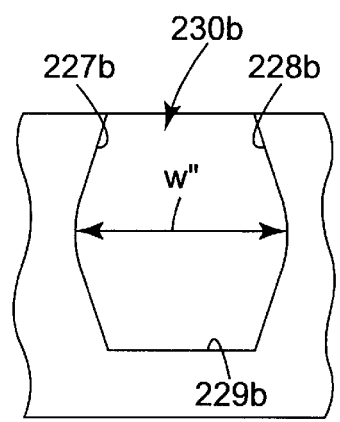
Figure 6C:
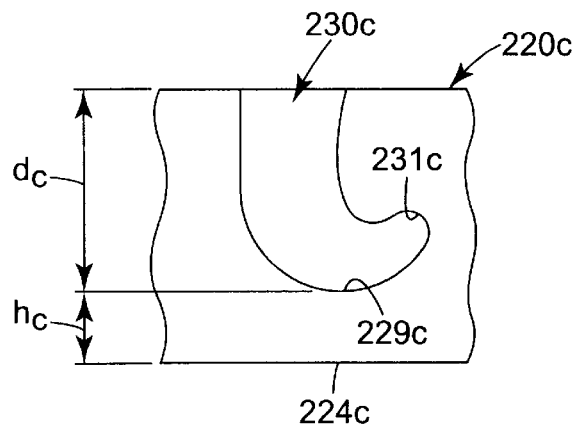

FIG. 6B depicts a mold cavity 230b in which the side walls 227b and 228b provide the cavity 230b with a varying width that reaches a maximum at some point between the opening of the cavity 230b and the bottom 229b of the cavity 230b. In the illustrated cavity 230b, the width w" is at a maximum near the midpoint of the depth of the cavity 230b. If the thickness of the wire in which the cavity 230b is formed is constant over the depth of the cavity, then the mold cavity 230b can be described as having a tangential cross-sectional area at its opening that is smaller than the tangential cross-sectional area of the cavity 230b at some point below its opening.

Figure 6D:
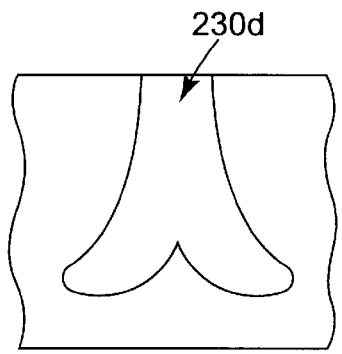

FIG. 6C depicts yet another variation in the shape of the mold cavities that can be provided in tool rolls of the present invention. The illustrated mold cavity 230c has a curved shape in the form of a hook. Mold cavities with that shape may be used to directly form hook strips without significant additional processing. FIG. 6D illustrates a mold cavity 230d including a double-ended hook shape that may also be molded by tool rolls according to the present invention.

Figure 6E:
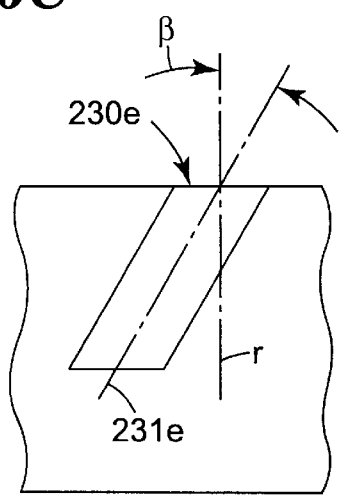

FIG. 6E depicts a variation in the orientation of mold cavities supplied in tool rolls according to the present invention. The mold cavity 230e is formed with an axis 231e that is oriented at an angle with respect to the radius r of the tool roll (not shown).

FIG. 7A illustrates a tool roll 310 in a plan view that includes areas 314 and 316 in which the mold cavities differ. In one example, areas 314 may be provided with mold cavities while areas 316 may be substantially free of mold cavities. In another example, the mold cavities in the different areas 314 and 316 may be different. The areas 314 and 316 on tool roll 310 are depicted as having a substantially uniform width and preferably also extend about the circumference of the roll 310.

Tool rolls according to the present invention may alternatively include areas in which the mold cavities differ that are not uniformly shaped and/or that do not extend around the circumference of the roll 310. One such variation is illustrated in FIG. 7B in which area 314' is oriented along the width of the tool roll 310' and surrounded on either side by areas 316'. As such, area 314' forms a longitudinal stripe along the roll 310'.

FIG. 7C illustrates another tool roll 310" that also includes areas 314" that have either no mold cavities or mold cavities that differ in some respect from the mold cavities in area 316". The areas 314" can take any shape, e.g., a logo as shown. Methods of manufacturing the tool roll 310" may include manufacturing a tool roll that includes uniformly shaped mold cavities distributed uniformly over its entire surface. After manufacturing the tool roll 310" with uniform mold cavities, one or more portions (e.g., areas 314") of the surface of the tool roll 310" can be masked while the other portion or portions (e.g., area 316") is processed to differentiate the mold cavities within the areas 314" from the mold cavities within the area 316". One method of processing the tool roll 310" could include, e.g., filling the mold cavities in the unmasked area either partially or completely. The materials used for filling could include solder, plastics, wax, etc. The materials used could be permanently located within the mold cavities or they may be removable to allow reuse of the tool roll with, e.g., a different logo.

Examples of different mold cavities 330a and 330b are illustrated in FIGS. 8A and 8B in which the depths of the mold cavities 330a and 330b are different. The mold cavity 330a has a depth $d_a$ that is greater than the depth $d_b$ of the mold cavity 330b. Although a difference in depth is illustrated, other variations may be provided in place of or in addition to depth variations, e.g., variations in shape, cross-sectional size, orientation, etc. as discussed above. Furthermore, the mold cavities within each area 314 and/or 316 may have uniform shape, spacing, size, depth and orientation or one or more of those characteristics may vary within the area.

FIGS. 9A–9D illustrate more variations in the wires used to form the mold cavities in the tool rolls of the present invention. The cross-sections are taken transverse to the lengths of the wires and, in FIG. 9A, the wire 420a is provided with a reverse L-shaped cross-section while the spacer wire 440a fits within the space formed between abutting wires 420a.

Figure 9A:
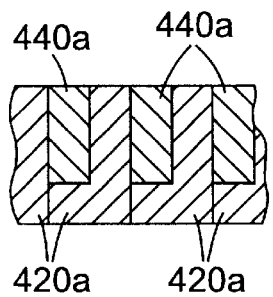
FIGS. 9A–9D illustrate different wire profiles for use in tool rolls according to the present invention.
Figure 9B:
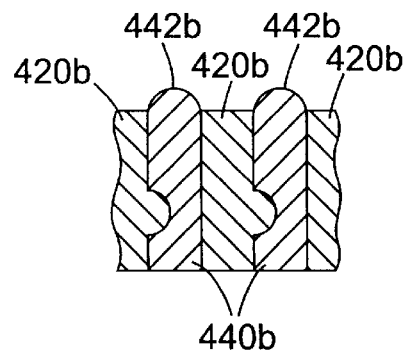

In FIG. 9B the wires 420b and 440b have mating profiles. In addition, wires 440b include a non-planar surface 442b that, in the illustrated embodiment, is a curved surface. Where the wires 420b include voids that form the desired mold cavities (not shown), the addition of a curvature to the outer surface 442b of wires 440b may produce a corresponding fillet on two sides of the base of the each protrusion formed by the mold cavities. That fillet may improve the strength of the protrusion, i.e., increase its resistance to deflection. In addition, the curvature may also produce a ridged structure between protrusions that may impart additional rigidity to the film or article.

Figure 9C:
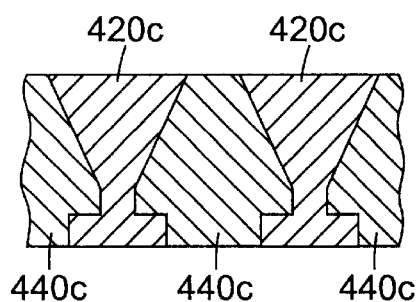
Figure 9D:
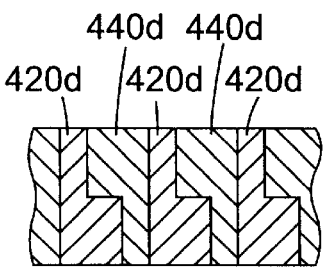

Wires 420c and 440c in FIG. 9C illustrate wires with mating profiles that also include tapered sides. FIG. 9D illustrates wires 420d and 440d that have nested profiles.

Using a wire or wires that include mating or nesting profiles as illustrated in FIGS. 9A–9D may improve the integrity of the windings on the base roll as the finished tool rolls are subjected to stresses during manufacture and use as a molding tool. Many other variations in the wire profiles may be envisioned within the scope of the present invention.

Figure 10:
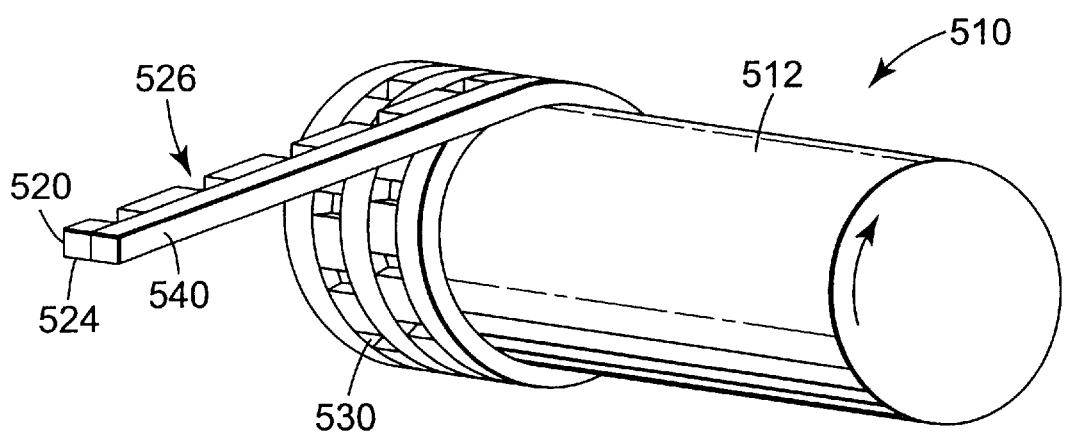
FIG. 10 illustrates one method of manufacturing a tool roll according to the present invention.

FIG. 10 illustrates one process of winding a base roll 512 with a wire 420 including voids 526 and a spacer wire 540 to provide a tool roll 510 including a plurality of mold cavities 530. It will be understood that more than two wires may be wound together if so desired.

In the methods of manufacturing tool rolls according to the present invention, it may be desirable to machine the outer surface of the tool roll 510 after winding the wires 520 and 540 to provide improved runout in the finished tool roll 510. Because the preferred wire 520 includes voids 526 formed with a fixed height above the inner edge 524 of the wire (see FIGS. 1–3C and accompanying description above), machining the outer surface of the tool roll 510 after winding may improve uniformity in the depth of the mold cavities 530.

It may also be desirable to remove any burrs remaining from, e.g., wire punching and/or machining of the wound roll, by blasting the roll with sodium bicarbonate (baking soda) or a similar material. The finished tool roll 510 may also be processed to provide a desired surface finish within the mold cavities 530 and/or on the outer surface of the tool roll 510 between the mold cavities 530. For example, it may be desirable to chemically etch, sandblast, plate, coat or otherwise modify the surfaces of the tool roll 510.

Figure 11:
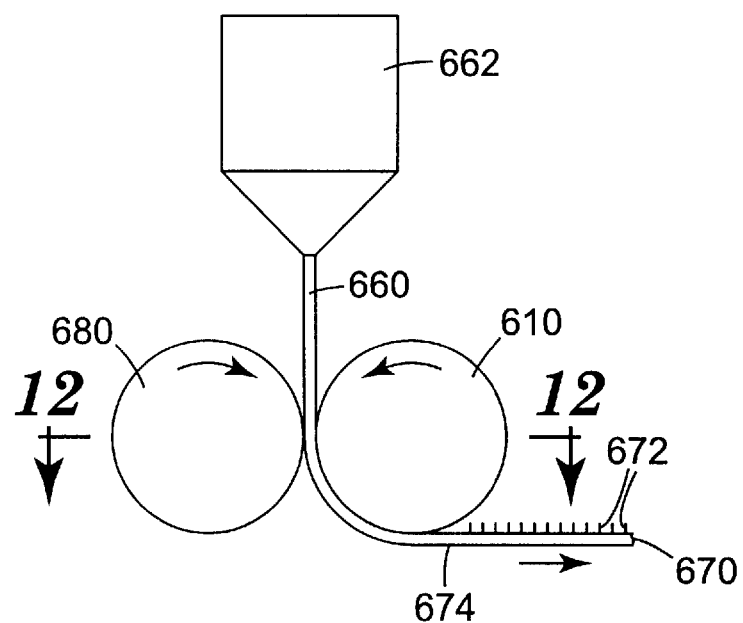
FIG. 11 illustrates one method of manufacturing a high aspect topology film using a tool roll according to the present invention.

FIG. 11 illustrates one process in which a tool roll 610 according to the present invention can be used to form a high aspect topology film. A moldable material 660 can be applied to the surface of the tool roll 610 by, e.g., extrusion or cast molding to create a film 670 including protrusions 672 that are replicas of the mold cavities in the tool roll 610. In preferred embodiments, adhesion of the material 660 to the tool roll 610 is less than the cohesion within the material 660 at the time of removal from the tool roll 610. It may be further preferred that the adhesion of the material 660 to the tool roll not exceed the tensile strength of the wire or wires used to form the tool roll 610.

Substantially any moldable material may be used in connection with the present invention. It may be preferred that the moldable material be an orientable thermoplastic resin. Orientable thermoplastic resins that can be extrusion molded and should be useful include polyesters such as poly(ethylene terephthalate), polyamides such as nylon, poly(styrene-acrylonitrile), poly(acrylonitrile-butadiene-styrene), polyolefins such as polypropylene, and plasticized polyvinyl chloride. One preferred thermoplastic resin is an impact copolymer of polypropylene and polyethylene containing 17.5% polyethylene and having a melt flow index of 30, that is available as SRD7-587 from Union Carbide, Danbury, Conn. The thermoplastic resin may also comprise blends, including polyethylene and polypropylene blends, co-polymers, such as polypropylene-polyethylene co-polymers, or coextruded as multiple layers or in alternating zones. Additives such as plasticizers, fillers, pigments, dyes, anti-oxidants, release agents, and the like may also be incorporated into the moldable material.

In one preferred process, the material 660 is provided by extrusion into a nip formed by the tool roll 610 and a backup roll 680. The backup roll 680 preferably provides some pressure to assist in forcing the moldable material 660 into the mold cavities 630 (see FIG. 12) provided in the tool roll 610. Alternatively, the backup roll 680 may be replaced by any continuously moving surface that can assist in forcing the mold material into the mold cavities in tool roll 610.

The interior of the tool roll 610 may be supplied with a vacuum to assist in removal of air that may otherwise interfere with complete filling of the mold cavities. However, in many instances, no vacuum may be supplied as the air within the mold cavities escapes between the wires used to manufacture the tool roll 610. In other words, the process may be performed in the absence of a vacuum.

It may also be desirable to provide some thermal control in either or both of the tool roll 610 and the backup roll 680. Depending on process conditions, temperatures of the moldable material 660, properties of the moldable material 660, etc. it may be desirable to either heat one or both of the rolls 610 and 680, cool one or both of the rolls 610 and 680, or heat one of the rolls and cool the other roll.

After the material 660 is forced within the mold cavities in tool roll 610 and has sufficiently cooled to form a film 670 with protrusions 672 that can maintain the desired shape or shapes, it is stripped from the tool roll 610 for further processing or the film 670 can be wound into rolls. For example, if mechanical fastener strips are desired, the film 674 may be directed into a station or stations to modify the protrusions, coat adhesives, and perform other processing as discussed in, e.g., U.S. Pat. Nos. 5,845,375 (Miller et al.), 5,077,870 (Melbye et al.), PCT Publication Nos. WO 98/57565; WO 98/57564; WO 98/30381; and WO 98/14086.

It may be desirable to direct one or more additional materials into the nip formed by the tool roll 610 and backup roll 680 to provide desired additional properties to the film 670. For example, a woven or nonwoven web may be directed into the nip. Alternatively, the film 670 may be laminated to one or more additional layers by, e.g., heat, adhesives, coextrusion, etc.

Figure 12:
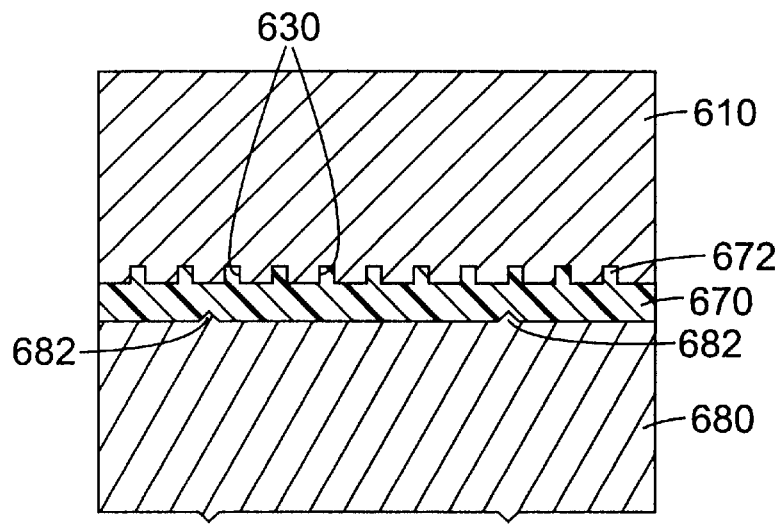
FIG. 12 is a cross-sectional view of the apparatus of FIG. 11, taken along line 12—12 in FIG. 11.

FIG. 12 is a cross-sectional view of the apparatus of FIG. 11 taken along line 12—12 in FIG. 11. The tool roll 610 includes mold cavities 630 filled by the moldable material to form protrusions 672 on film 670. Also illustrated in FIG. 12 are two raised structures 682 formed on the backup roll 680. One advantage of the raised structures 682 on the illustrated backup roll 680 is that each of the raised structures may create a line or zone of weakness along which the film 670 can be separated. The raised structures 682 are, however, optional and need not be provided in connection with the present invention.

Another optional feature that may be incorporated into the backup roll 680 is the addition of some structure to the surface of the roll 680 to increase its surface area. The increased surface area on the backup roll 680 can increase the surface area on the film 670, thereby improving adhesion of any adhesives provided on the back side 674 of the film 670. One example of useful structure could be a micro-embossed pattern of linear prisms on the scale of about 400 lines per inch (160 lines per centimeter).

Figure 13:
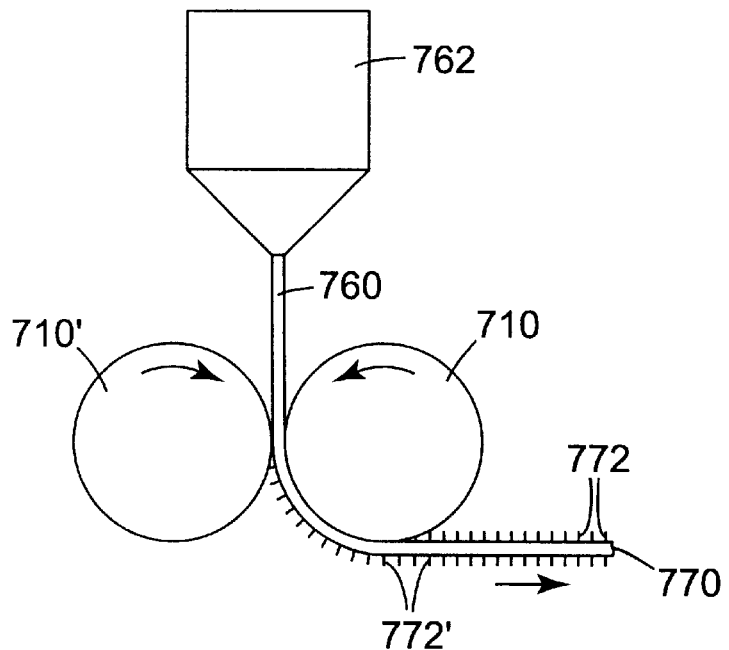
FIG. 13 illustrates one method of manufacturing a high aspect topology film including protrusions on both sides using two tool rolls according to the present invention.

FIG. 13 illustrates another process using wire-wound tool rolls with mold cavities formed therein. The illustrated process forms a film 770 having protrusions 772 extending from one side thereof and protrusions 772' extending from the opposite side of the film 770. The two-sided film 770 is formed by opposing tool rolls 710 and 710', both of which include mold cavities formed therein. The protrusions 772 and 772' may have the same characteristics in terms of size, shape, orientation, etc. or they may be different.

Figure 14:
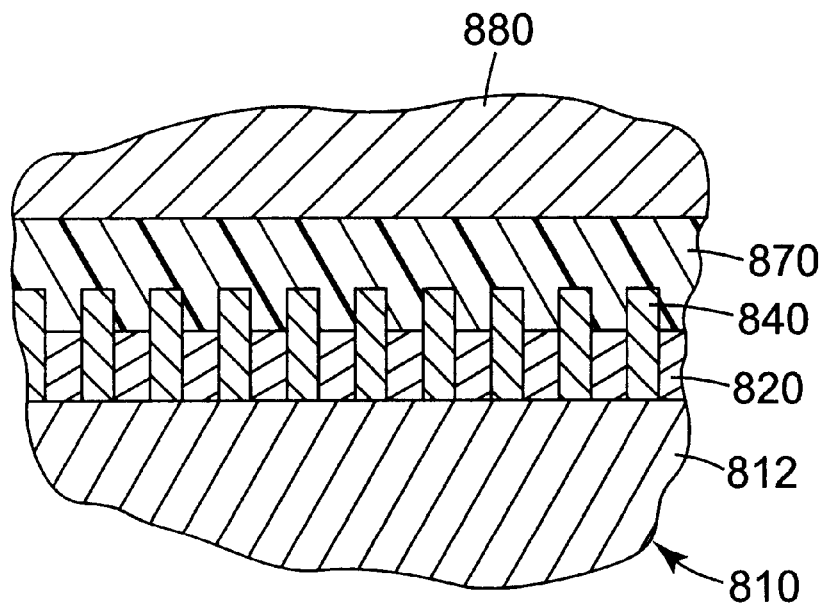
FIG. 14 is an enlarged partial cross-sectional view of a process using another tool roll according to the present invention.

FIG. 14 is an enlarged cross-sectional view of the interface of another tool roll 810 with a backup roll 880. Film 870 is located between the two rolls 810 and 880 and one surface of the film 870 is formed with a series of substantially continuous ridges formed thereon that are essentially negative images of the structure on the tool roll 810.

Tool roll 810 is formed by wires 820 and 840 which are helically wound around a base roll 812. Wire 840 has a taller profile than the other wire 820, resulting in a tool roll 810 on which grooves are formed between windings of wire 840. Although wires 820 and 840 are disclosed as having generally rectangular profiles, they could alternately be provided with a different shape, in which case the film 870 would also be formed with a different shape than that illustrated in FIG. 14. Furthermore, it will be understood that two tool rolls could be used in a process similar to that depicted in FIG. 13 to form a film with structures or protrusions on both major sides of the film.

Figure 15:
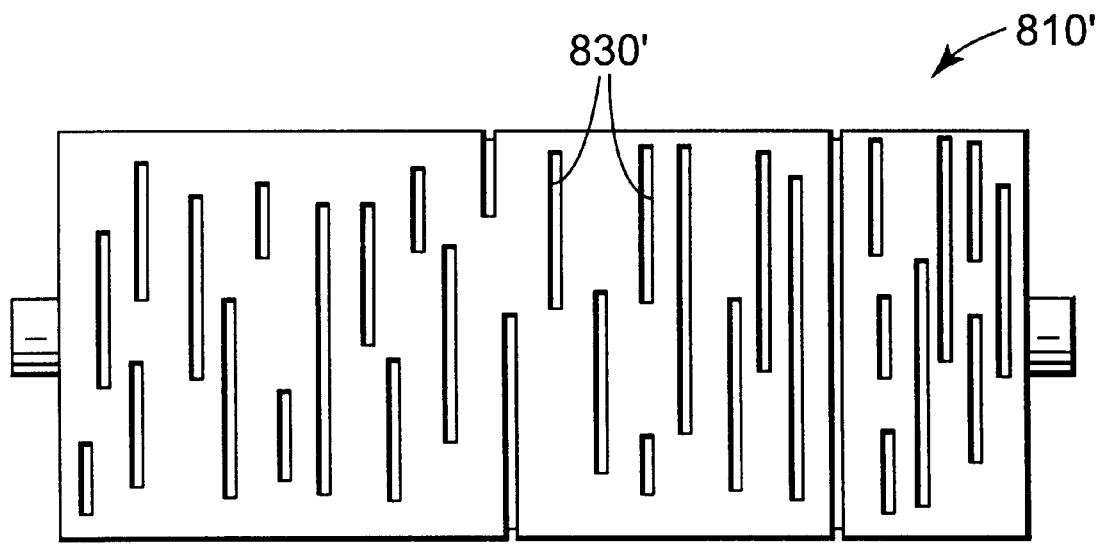
FIG. 15 is a plan view of another tool roll including elongated discontinuous helical mold cavities.

Although the grooves formed by the wires 820 and 840 wrapped around the tool roll 810 of FIG. 14 may be continuous around the circumference of the roll 810, they may also be discontinuous. FIG. 15 is a plan view of a tool roll 810' including mold cavities 830' that extend for some length around the tool roll 810', but are not formed in a continuous helical groove as discussed above with respect to FIG. 14. The elongated mold cavities 830' can be formed by wires including voids formed therein as discussed above. The voids in the wires used in roll 810' will, however, extend for longer distances over the length of the wires.

These elongated voids may be uniformly sized and spaced as depicted in the tool rolls above, or they may be non-uniformly sized and non-uniformly spaced. Tool roll 810' illustrates a wire with non-uniformly sized and spaced voids that, when wrapped around a base roll, forms non-uniformly sized and spaced mold cavities 830'.

Figure 16:
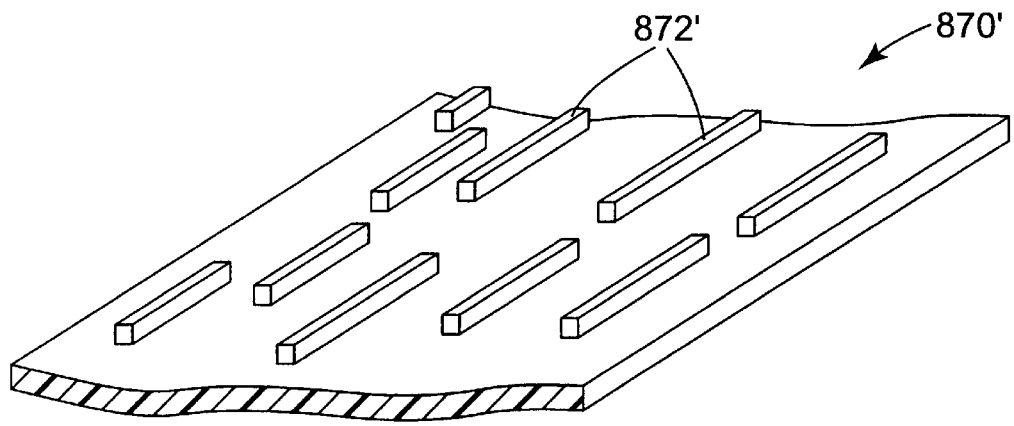
FIG. 16 is a perspective view of a film manufactured using the tool roll of FIG. 15.

The film produced by a roll such as tool roll 810' will include elongated protrusions 872' as illustrated in FIG. 16. Because the mold cavities 830' in roll 810' are non-uniformly sized and spaced, the elongated protrusions 872' are also non-uniformly sized and spaced.

EXAMPLES

At least some of the advantages of the invention are illustrated by the following example. However, the particular materials and amounts thereof recited in these example, as well as other conditions and details, are to be interpreted to apply broadly in the art and should not be construed to unduly limit the invention.

Figure 17:
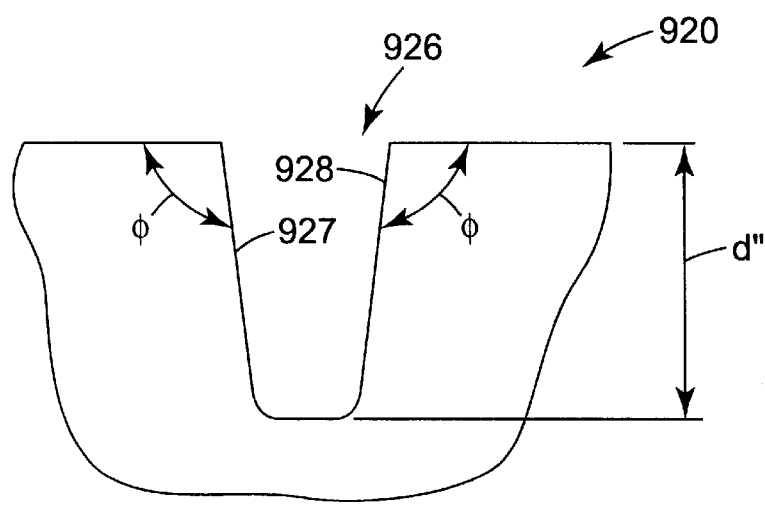
FIG. 17 illustrates a void formed in a wire in connection with Example 1.

A wire-wound tool roll was produced using a 0.007 inch by 0.059 inch (0.178 millimeter (mm) by 1.49 mm) continuous rectangular wire ribbon. The ribbon was wire punched by Hollingsworth on Wheels, Inc., Greenville, S.C. FIG. 17 depicts the general shape of the voids 926 punched into the wire 920. The voids 926 were punched at a spacing of forty voids 926 per inch (about 16 voids per centimeter) along the length of the wire. The width w of the opening was approximately 0.0068 inches (0.172 mm). The sides 927 and 928 of the void 926 were formed with an angle $\phi$ of about 97 degrees as measured from the top surface 922 of the wire 920. The overall depth d" of the voids 926 as seen in FIG. 17 was approximately 0.0215 inches (0.546 mm).

The wire 920 was then wound with a spacer wire having a rectangular profile of 0.018 inches by 0.059 inches (0.457 mm by 1.49 mm). The base roll on which the wires were wound had a 12 inch diameter (305 mm) and a face that was 14 inches wide (356 mm). The winding was also performed by Hollingsworth on Wheels, Inc. using known carding roll industry techniques.

The wound tool roll was then located in an extrusion take-away as depicted in, e.g., FIG. 11, with a backup roll to force resin into the mold cavities. The backup roll was silicone coated with a durometer hardness of 55.

A 2 inch (50.8 mm) single screw extruder was used in connection with a 14 inch wide (356 mm) slot die. The resin used was SRD7-587 thermoplastic polypropylene available from Union Carbide Company, Danbury, Conn.

The resin was extruded from the die at a temperature of 450 degrees Fahrenheit (232 degrees Celsius) into the nip takeaway formed by the tool roll and silicone backup roll. which were operating at a speed of 35 feet per minute (10.6 meters per minute) and a nip pressure of 60 pounds per linear inch (105 Newtons per centimeter (N/cm)). Complete filling of the mold cavities was obtained with a peel force for the formed film of about 2.5 pounds per linear inch (4.4 N/cm) for a 10 inch wide (254 mm) web.

The base roll used to manufacture the tool roll was a chill roll and the surface temperature of the tool roll was maintained between 105 and 110 degrees Fahrenheit (40.5 degrees Celsius and 43.3 degrees Celsius) while the surface temperature of the backup roll was maintained at about 150 degrees Fahrenheit (65 degrees Celsius).

Using the above process conditions, a high aspect topology film was produced with a basis weight of 150 grams per square meter. The film from which the protrusions extends had a thickness of about 110 micrometers.

All patents, patent applications, and publications cited herein are each incorporated herein by reference in their entirety, as if individually incorporated by reference. Various modifications and alterations of this invention will become apparent to those skilled in the art without departing from the scope of this invention, and it should be understood that this invention is not to be unduly limited to the illustrative embodiments set forth herein.

What is claimed is:

1. A tool roll comprising:
   a cylindrical base roll;
   a first wire comprising a plurality of first voids formed therein, the first wire being wound in helical coils around the base roll, wherein the plurality of first voids in the first wire form a plurality of first cavities, each cavity of the plurality of first cavities comprising an opening at an outer surface of the tool roll.

2. A tool roll according to claim 1, wherein the first wire comprises an inner edge and an outer edge, and further wherein the distance between the inner edge of the first wire and a bottom of each cavity in the plurality of first cavities is substantially constant.

3. A tool roll according to claim 1, further comprising a metal plating in the plurality of first cavities.

4. A tool roll according to claim 3, wherein the metal plating is located on the outer surface of the tool roll.

5. A tool roll according to claim 1, wherein at least some of the first cavities in the plurality of first cavities comprise rectilinear tangential cross-sections.

6. A tool roll according to claim 1, wherein at least some of the first cavities in the plurality of first cavities comprise substantially constant tangential cross-sectional areas.

7. A tool roll according to claim 1, wherein each cavity in the plurality of first cavities comprises a tangential cross-sectional area proximate a bottom of the cavity that is larger than the tangential cross-sectional area at the opening of the cavity.

8. A tool roll according to claim 1, wherein each cavity in the plurality of first cavities comprises a tangential cross-sectional area at the opening of the cavity that is larger than the tangential cross-sectional area proximate a bottom of the cavity.

9. A tool roll according to claim 1, wherein each cavity in the plurality of first cavities comprises a tangential cross-sectional area at the opening of the cavity that is smaller than the tangential cross-sectional area of the cavity at some point between the opening of the cavity and the base roll.

10. A tool roll according to claim 1, wherein the depth of each cavity in the plurality of first cavities is substantially constant.

11. A tool roll according to claim 1, wherein at least some of the cavities in the plurality of cavities have a bottom that is distinct from an end of the at least some cavities.

12. A tool roll according to claim 1, wherein at least one area of the outer surface of the tool roll is substantially free of cavities.

13. A tool roll according to claim 1, wherein a substantially cylindrical section of the outer surface of the tool roll is substantially free of cavities.

14. A tool roll according to claim 1, wherein a substantially longitudinal section of the outer surface of the tool roll is substantially free of cavities.

15. A tool roll according to claim 1, further comprising a second wire wound round the base roll, wherein the second wire is located between adjacent helical coils of the first wire.

16. A tool roll according to claim 15, wherein each of the first cavities is bounded on two sides by the second wire.

17. A tool roll according to claim 15, wherein the second wire comprises an outer edge and further wherein the outer edge of the second wire is even with the outer edge of the first wire.

18. A tool roll according to claim 15, wherein the second wire comprises a substantially uniform cross-section.

19. A tool roll according to claim 15, wherein the second wire comprises a plurality of second voids formed therein, the plurality of second voids in the second wire forming a plurality of second cavities, each second cavity of the plurality of second cavities comprising an opening at an outer surface of the tool roll.

20. A tool roll according to claim 19, wherein each of the first cavities is bounded on two sides by the second wire, and further wherein each of the second cavities is bounded on two sides by the first wire.

21. A method of forming a structured surface on an article, the method comprising:
   providing a tool roll comprising a cylindrical base roll and a first wire comprising a plurality of first voids formed therein, the first wire being wound in helical coils around the base roll, wherein the plurality of first voids in the first wire form a plurality of first cavities, each cavity of the plurality of first cavities comprising an opening at an outer surface of the tool roll;
   contacting a moldable material to the outer surface of the tool roll to form the structured surface using the outer surface of the tool roll, the moldable material at least partially filling at least some of the first cavities; and
   removing the structured surface from the outer surface of the tool roll, wherein the structured surface comprises a plurality of protrusions corresponding to the plurality of first cavities.

22. A method according to claim 21, wherein the first wire comprises an inner edge and an outer edge, and further wherein the distance between the inner edge of the first wire and a bottom of each cavity in the plurality of first cavities is substantially constant.

23. A method according to claim 21, wherein the tool roll further comprises a metal plating.

24. A method according to claim 21, wherein at least some of the first cavities in the plurality of first cavities comprise rectilinear tangential cross-sections and further wherein the protrusions comprise rectilinear cross-sections.

25. A method according to claim 21, wherein the depth of each cavity in the plurality of first cavities is substantially constant and further wherein each of the protrusions has a substantially constant height.

26. A method according to claim 21, wherein the tool roll further comprises a second wire wound around the base roll, wherein the second wire is located between adjacent helical coils of the first wire.

27. A method according to claim 26, wherein the second wire comprises a plurality of second voids formed therein, the plurality of second voids in the second wire forming a plurality of second cavities, each second cavity of the plurality of second cavities comprising an opening at the outer surface of the tool roll.

28. A method of forming a structured surface on an article, the method comprising:

providing a tool roll comprising a cylindrical base roll, a first wire wound in helical coils around the base roll, and a second wire wound in helical coils around the base roll, wherein the helical coils of the first and second wires alternate over a width of the roll and further wherein the height of the first wire above the base roll is less than the height of the second wire above the surface of the base roll, whereby a helical groove is formed on an outer surface of the tool roll;

contacting a moldable material to the outer surface of the tool roll to form a structured surface on an article using the outer surface of the tool roll, the moldable material at least partially filling at least a portion of the helical groove formed by the first and second wires; and removing the structured surface from the tool roll, wherein the structured surface comprises a series of ridges.

29. A method according to claim 28, wherein the helical groove is substantially continuous about and along the outer surface of the tool roll.

30. A method according to claim 28, wherein the first and second wires have generally rectangular profiles.

\* \* \* \* \*